United States Patent
Chang et al.

(10) Patent No.: US 10,427,669 B2
(45) Date of Patent: Oct. 1, 2019

(54) METHOD AND APPARATUS FOR CONTROLLING DISTRIBUTION OF FRONT AND REAR WHEEL TORQUE OF FOUR-WHEEL DRIVE VEHICLE

(71) Applicants: HYUNDAI MOTOR COMPANY, Seoul (KR); KIA MOTORS CORPORATION, Seoul (KR)

(72) Inventors: Young Joon Chang, Yongin-si (KR); Jeong Soo Eo, Hwaseong-si (KR); Youn Kwang Jung, Suwon-si (KR); Sung Jae Kim, Suwon-si (KR); Ji Won Oh, Hwaseong-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 99 days.

(21) Appl. No.: 15/688,394

(22) Filed: Aug. 28, 2017

(65) Prior Publication Data
US 2018/0162349 A1 Jun. 14, 2018

(30) Foreign Application Priority Data
Dec. 9, 2016 (KR) .......................... 10-2016-0167199

(51) Int. Cl.
*B60W 20/10* (2016.01)
*B60W 30/188* (2012.01)
(Continued)

(52) U.S. Cl.
CPC .............. *B60W 20/10* (2013.01); *B60K 6/52* (2013.01); *B60W 20/00* (2013.01); *B60W 20/15* (2016.01); *B60W 20/19* (2016.01); *B60W 30/18* (2013.01); *B60W 30/188* (2013.01); *B60W 40/10* (2013.01); *B60W 40/105* (2013.01);
(Continued)

(58) Field of Classification Search
None
See application file for complete search history.

(56) References Cited

U.S. PATENT DOCUMENTS 6,112,146 A * 8/2000 Mueller .................. B60T 8/172
                                                              180/197
6,405,116 B1 * 6/2002 Koibuchi ........... B60K 31/0008
                                                              180/170

(Continued)

*Primary Examiner* — Timothy Hannon
(74) *Attorney, Agent, or Firm* — Brinks Gilson & Lione

(57) ABSTRACT

The present disclosure provides an apparatus for controlling distribution of torque of front and rear wheel of a four-wheel drive (4WD) vehicle, including: a slip control torque calculator configured to calculate slip control torque of the rear wheels from information collected from the vehicle during driving in a 4WD mode; a handling control torque calculator configured to calculate handling control torque for the rear wheels from information collected from the vehicle during driving in the 4WD mode; a weighting factor determiner configured to determine a slip control weighting factor and a handling control weighting factor based on vehicle state information; and a target torque calculator configured to calculate target torque of rear wheel by summing the weighting factors applied to the slip control torque and handling control torque, respectively, wherein the target torque of the rear wheel is a target value of the torque distributed to the real wheel.

20 Claims, 3 Drawing Sheets

(51) Int. Cl.
  *B60W 40/10*      (2012.01)
  *B60W 30/18*      (2012.01)
  *B60W 40/105*     (2012.01)
  *B60K 6/52*       (2007.10)
  *B60W 20/00*      (2016.01)
  *B60W 20/15*      (2016.01)
  *B60W 20/19*      (2016.01)

(52) U.S. Cl.
  CPC ..... *B60W 2520/26* (2013.01); *B60W 2520/30* (2013.01); *B60W 2720/26* (2013.01); *B60W 2720/403* (2013.01)

(56) References Cited

U.S. PATENT DOCUMENTS

| | | | |
|---|---|---|---|
| 7,517,298 B2 | 4/2009 | Ortmann | |
| 8,521,349 B2* | 8/2013 | Yu | B60K 7/0007 |
| | | | 701/22 |
| 2008/0086248 A1* | 4/2008 | Lu | B60T 8/171 |
| | | | 701/41 |
| 2017/0320487 A1* | 11/2017 | Greene | B60T 8/175 |

* cited by examiner

METHOD AND APPARATUS FOR CONTROLLING DISTRIBUTION OF FRONT AND REAR WHEEL TORQUE OF FOUR-WHEEL DRIVE VEHICLE

CROSS-REFERENCE TO RELATED APPLICATION

The present application claims priority to and the benefit of Korean Patent Application No. 10-2016-0167199, filed on Dec. 9, 2016, which is incorporated herein by reference in its entirety.

FIELD

The present disclosure relates to a method and apparatus for controlling distribution of front and rear wheel torque of a four-wheel drive (4WD) vehicle.

BACKGROUND

The statements in this section merely provide background information related to the present disclosure and may not constitute prior art.

In general, a hybrid vehicle refers to a vehicle driven by an internal combustion engine (ICE) using fossil fuel and a motor using electric energy as a driving source.

As a type of a power train of a hybrid vehicle, a transmission mounted electric device (TMED) method of disposing a transmission at an output side of a motor for driving a vehicle has been known.

In a general TMED method, an engine clutch is interposed between an engine and a motor which are driving sources and a transmission is disposed at an output side of the motor so as to transfer complex power of the engine and the motor between which the engine clutch is interposed to a driving wheel through the transmission.

In addition, a TMED hybrid vehicle uses a method in which an engine and a motor are arranged together at a side of a front wheel, a driving wheel so as to permit torques output of the engine and the motor to be overlaid and then to transfer the output to the front wheel through the transmission and, accordingly, only torque transferred to the front wheel is controlled without distribution of driving force to front and rear wheels.

In addition, as another type, a rear-axle mounted electric device (RMED) method has been known and an RMED hybrid vehicle is configured to drive a front wheel by engine power and to drive a rear wheel by motor power.

The RMED method employs a four-wheel drive (4WD) method and U.S. Pat. No. 7,517,298 discloses an electronic-4WD (e-4WD) method of applying a motor to a rear wheel without a propeller shaft, a mechanical power device in order to enhance efficiency of a 4WD vehicle.

As such, a hybrid vehicle with an e-4WD system uses independent drivers that are applied to a front wheel and a rear wheel, respectively and, in this regard, an engine is applied to a driver of the front wheel, a motor is applied to a driver of the rear wheel, and the drivers are independently or simultaneously driven under a condition of a driving environment.

For example, it may be possible to perform switching between a two-wheel drive (2WD) mode and a 4WD mode, and only the front wheels function as driving wheels in the 2WD mode but both the front wheels and the rear wheels function as driving wheels because driving force is distributed to the front wheels and the rear wheels in the 4WD mode.

In the 4WD mode, since driving force is distributed to the front wheels and the rear wheels, torque transferred to the rear wheels as well as the front wheels is controlled and, in this case, torque is distributed to the front wheels and the rear wheels so as to satisfy total torque requirement required for vehicle driving.

Hereinafter, according to a result of distribution of driving force to the front wheels and the rear wheels, torque applied to the front wheels from a driving source of a vehicle will be referred to as front wheel torque or torque of front wheel and torque applied to the rear wheels will be referred to rear wheel torque or torque of rear wheel.

Accordingly, in order to satisfy the total torque requirement required for vehicle driving, that is, driver torque requirement, the front wheel torque and the rear wheel torque are distributed and controlled and, in the above e-4WD system, torque output from a motor is controlled in order to control the rear wheel torque.

The e-4WD system is configured to differentially distribute driving force of front and rear wheels according to driving situation so as to enhance driving stability.

In general, control of a 4WD system includes slip control for improved distribution of driving force to front/rear wheels in order to provide normal startup, acceleration, and hill-climbing capabilities when there is a speed difference between the front wheels and the rear wheels during vehicle startup or acceleration, particularly, hill climbing on a slippery road and handling control for optimal distribution of driving force to front/rear wheels in order to inhibit understeer or oversteer during cornering and to ensure normal cornering.

As is well known, control strategies for providing driving stability of a vehicle are largely configured to make dynamic characteristics of respective driving, braking, steering, and suspension systems of a vehicle to satisfy target performance based on the driving, braking, steering, and suspension systems.

The control strategies are independently configured, priority based on stability is allocated according to a driving condition and a running condition of a vehicle, and the vehicle sequentially enters corresponding control with the allocated priority.

4WD slip control and handling control are also managed according to cooperative control strategy similar to the above strategy and, in general, a vehicle preferentially enters handling control compared with slip control and is driven in corresponding control.

However, there is a limit in providing stability in a complex driving situation (e.g., slip startup on curved road)) using an on/off method of single control. When there is frequent transition between control modes, response performance in a transient period may be affected.

SUMMARY

In one aspect, the present disclosure provides a method and an apparatus for controlling distribution of front and rear wheel torque of a four-wheel drive (4WD) vehicle in order to simultaneously achieve slip control and handling control effects of rear wheels during driving in a 4WD mode.

In one form of the present disclosure, an apparatus for controlling distribution of torque of front and rear wheels of a four-wheel drive (4WD) vehicle including: a slip control torque calculator configured to calculate slip control torque of the rear wheels based on information collected from the vehicle during driving in a 4WD mode; a handling control torque calculator configured to calculate handling control torque for the rear wheels based on the information collected from the vehicle during driving in the 4WD mode; a weighting factor determiner configured to determine a slip control weighting factor and a handling control weighting factor based on vehicle state information; and a target torque calculator configured to calculate target torque of the rear wheels by summing weighting factor applied to the slip control torque and the handling control torque, respectively, wherein the target torque of the rear wheels is a target value of the torque distributed to the real wheels.

In another form of the present disclosure, a method of controlling distribution of torque of front and rear wheels of a four-wheel drive (4WD) vehicle including: calculating, with a controller, slip control torque of the rear wheels based on information collected from the vehicle during driving in a 4WD mode; calculating, with the controller, handling control torque for the rear wheels based on the information collected from the vehicle during driving in the 4WD mode; determining, with the controller, a slip control weighting factor and a handling control weighting factor based on vehicle state information; and calculating, with the controller, target torque of the rear wheels by summing the weighting factors applied to the slip control torque and the handling control torque, respectively, wherein the target torque of the rear wheels is a target value of torque distributed to the rear wheels.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
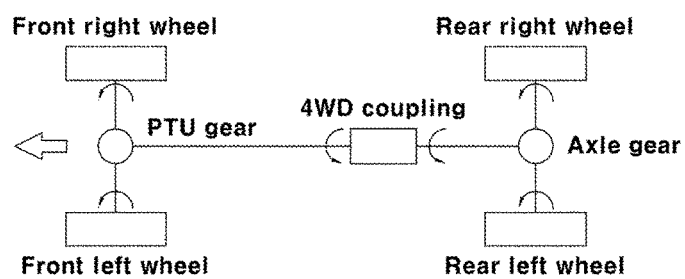
FIG. 1 is a reference diagram explaining a method of calculating front wheel speed and rear wheel speed during general slip control.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

To enhance the understanding of the present disclosure, slip control and handling control of a vehicle will be described below.

In slip control, a speed difference between front and rear wheels of a vehicle (a speed difference between front and rear axles) is calculated and, when the calculated speed difference is equal to or greater than a reference value, it is determined that slip occurs and driving force of front and rear wheels is distributed in order to overcome slip.

In this case, wheel speed of each wheel, that is, wheel speed of front left and right wheels and wheel speed of rear left and right wheels may be detected through a sensor and the front wheel speed and the rear wheel speed may be calculated from each of the detected wheel speeds.

Here, a value obtained by converting a wheel speed average of the left wheel and the right wheel into wheel speed in a four-wheel drive (4WD) system illustrated in FIG. 1 may be used as the front wheel speed and the rear wheel speed.

In this case, the front wheel speed and the rear wheel speed may be calculated according to Equations 1 and 2 below.

$$FrontWheelSpeed = \frac{FLwheelSpeed + FRwheelSpeed}{2} \times \frac{PTUGearRatio}{TireDynamicRadius} \times \frac{1000}{120\Pi} \quad \text{[Equation 1]}$$

$$RearWheelSpeed = \frac{RLwheelSpeed + RRwheelSpeed}{2} \times \frac{AxleGearRatio}{TireDynamicRadius} \times \frac{1000}{120\Pi} \quad \text{[Equation 2]}$$

Here, "FL wheel speed" is a front left wheel speed, "FR wheel speed" is a front right wheel speed, "RL wheel speed" is a rear left wheel speed, and "RR wheel speed" is a rear right wheel speed.

"PTU gear ratio" is a gear ratio of a power transfer unit (PTU), "axle gear ratio" is a gear ratio of an axle gear, and "PTU gear ratio", "axle gear ratio", and "tire dynamic radius" are each a unique data value of a vehicle.

The PTU is a device that is installed between a driving shaft of a front wheel and a propeller shaft connected to the rear wheel and switches a current mode to one of a two-wheel drive (2WD) and a 4WD mode.

When slip occurs and the front wheel speed and the rear wheel speed are acquired in real time as described, distribution of driving force to the front wheel and the rear wheel may be adjusted to avoid slip. In the event that a speed difference between the front wheel and the rear wheel is equal to or greater than a reference value, if the front wheel speed is greater than the rear wheel speed, it may be determined that front wheel slip occurs and rear wheel driving force (rear wheel torque) may be increased. By contrast, if the front wheel speed is less than the rear wheel speed, it may be determined that rear wheel slip occurs and rear wheel driving force may be reduced.

In addition, in handling control during cornering (curved road), a yaw rate of a rotary-driving vehicle may be calculated and estimated, a difference between the estimated yaw rate and a target yaw rate, i.e., a yaw rate error for determining whether understeer or oversteer occurs may be acquired and, then, distribution of driving force to the front wheel and the rear wheel may be controlled in order to avoid understeer or oversteer when an excessive yaw rate error occurs.

For example, a yaw rate $\psi$ may be estimated according to Equation 3 below.

$$\psi = \delta \times (V/L)/(1 + K \times V^2/L) \quad \text{[Equation 3]}$$

Here, $\delta$ is a steering angle, V is a vehicle speed, L is a wheelbase, and K is an understeer gradient.

The understeer gradient K may be calculated according to $K=m \times (C_r \times I_r - C_f \times I_f)/(2C_r \times C_f \times L))$.

Here, m is a vehicle weight, $C_f$ is a cornering stiffness of a front wheel tire, $C_r$ is a cornering stiffness of a rear wheel tire, $I_f$ is a distance from a vehicle center to front axle, and $I_r$ is a distance from the vehicle center to a rear axle.

A yaw rate error $\psi_e$ may be obtained from a difference between the estimated yaw rate and the target yaw rate. When the yaw rate error is greater than 0, this means an oversteer situation. When the yaw rate error is less than 0, this means an understeer situation.

When the yaw rate error is obtained in real time, whether vehicle understeer or oversteer occurs may be determined. Also, distribution of driving force to the front wheels and the rear wheels may be adjusted. When the yaw rate error is greater than 0, rear wheel driving force (rear wheel torque) may be reduced. However, when the yaw rate error is less than 0, understeer may be determined to occur and rear wheel driving force may be increased.

Conventionally, an on/off method of separately and independently operating and performing the above slip control and handling control according to priority and selecting only one of the two control modes is performed.

However, when only one control is performed according to priority, there is a limit in providing stability in a complex driving situation and, when there is frequent transition between control modes, response performance in a transient period may be affected.

Accordingly, the present disclosure proposes a method and apparatus for controlling torque distribution to combine slip control and handling control with respect to a rear wheel in a 4WD vehicle.

The present disclosure employs a method of summing values obtained by applying weighting factors to slip control torque and handling control torque for improved combination of two controls according to a driving situation in order to determine target rear wheel torque as a target value of driving force distributed to the rear wheel during vehicle driving in a 4WD mode.

That is, unlike the conventional cooperative control method of adjusting separate control mode entrance and release so as to perform any one of two control modes of slip control and handling control according to priority of the two control modes, the present disclosure employs an output blending method of summing values obtained by applying weighting factors obtained in consideration of core parameters for determination of dynamic characteristics of an entire system to control torque of each mode in order to determine target rear wheel torque in a 4WD mode.

As described above, control of a 4WD system includes slip control for improved distribution of driving force to front/rear wheels in order to provide normal startup, acceleration, and hill-climbing capabilities when there is a speed difference between the front wheel and the rear wheel during vehicle startup or acceleration, particularly, hill climbing on a slippery road and handling control for improved distribution of driving force to front/rear wheels in order to inhibit understeer or oversteer during cornering and to provide normal cornering.

Such slip control and handling control are used for improved distribution of driving force to the front wheel and the rear wheel in order to overcome problems during vehicle driving and, in detail, for improved distribution (distribution of torque to the rear wheel) of driving force applied to the rear wheel from a vehicle driving source.

In some forms of the present disclosure, target rear wheel torque may be basically determined and distribution of driving force may be controlled so as to apply target torque to the rear wheel using the determined target rear wheel torque as the target torque.

In some forms of the present disclosure, the front wheel torque and the rear wheel torque may be distributed so as to satisfy total torque requirement required for vehicle driving, i.e., driver torque requirement and, in the case of an electronic-4WD (e-4WD) system with a motor installed as a driver of the rear wheel, motor driving may be controlled so as to output target rear wheel torque as a target value.

As such, a 4WD vehicle may be an e-4WD vehicle configured by installing an engine as a driver of front wheels and motor as a driver of rear wheels without a propeller shaft.

In the e-4WD vehicle, it may be possible to perform switching between a 2WD mode and a 4WD mode, front wheels function as driving wheels and rear wheels function as driven wheels in the 2WD mode, and both the front wheels and the rear wheels function as driving wheels because driving force is distributed to the front wheels and the rear wheels in the 4WD mode.

In the 4WD mode, torque transferred to the rear wheels as well as the front wheels may also be controlled. when a target value (target rear wheel torque) of torque applied to the rear wheels that is outputted by a driver is determined by summing weighting factors as described later, driving of the rear wheels may be controlled so as to output torque of the target value.

The present disclosure is not limited to the above e-4WD vehicle and may be applied to a vehicle that is capable of switching between 2WD and 4WD modes, a vehicle that is capable of distributing driving force to the front wheels and the rear wheels in a 4WD mode, and any vehicle that is capable of controlling rear wheel torque using a target value according to a distribution result of driving force distribution without limitation to a specific 4WD vehicle.

An example of a vehicle may be a 4WD vehicle including an engine and a motor installed as a driving source for driving the vehicle and a mechanical or electronic type power distribution device such as a transfer case for distributing power of the engine or the motor to a front wheel and a rear wheel according to a desired power distribution ratio.

Another example of the vehicle may be a 4WD vehicle configured to distribute power transferred from a driving source, (i.e., motor power (EV mode) or combined power (HEV mode) of an engine and a motor) to a front wheel and a rear wheel by a power distribution device such as a transfer case in a hybrid vehicle, which uses the engine and the motor as a driving source.

In this case, in the 2WD mode, a transfer case may distribute power only to the front wheel without distribution to the rear wheels such that the front wheels function as driving wheels and the rear wheels function as a driven wheel. In the 4WD mode, both the front wheels and the rear wheels function as driving wheels because driving force is distributed to the front wheels and the rear wheels in the 4WD mode.

Hereinafter, a control apparatus and method in some forms of the present disclosure will be described in detail.

Figure 2:
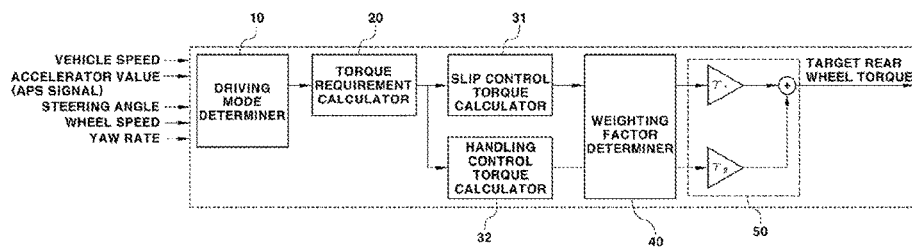
FIG. 2 is a block diagram illustrating a structure of an apparatus for controlling distribution of torque of a four-wheel drive (4WD) vehicle.

FIG. 2 is a block diagram illustrating a structure of an apparatus for controlling distribution of front and rear wheel torque of a 4WD vehicle in some forms of the present disclosure. It shows components for driving mode determination, torque requirement calculation, slip and handling control torque calculation, weighting factor determination, and target rear wheel torque calculation.

Figure 3:
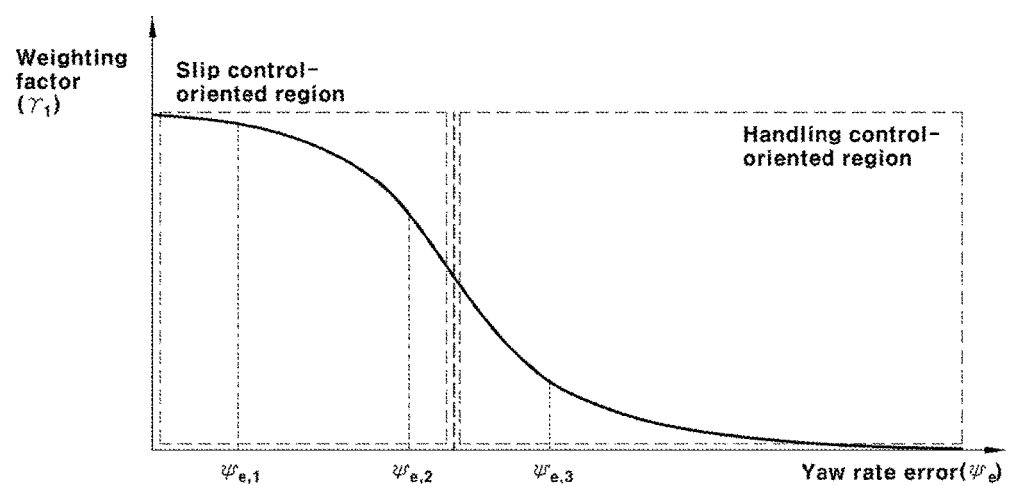
FIG. 3 is a flowchart illustrating a method of a controlling distribution of front and rear wheel torque.

FIG. 3 is a flowchart of a method of a controlling distribution of front and rear wheel torque in some forms of the present disclosure.

As illustrated in FIG. 2, the control apparatus in some forms of the present disclosure may include a driving mode determiner 10 for determining a driving mode of a vehicle, a torque requirement calculator 20 for calculating driver torque requirement, a slip control torque calculator 31 for calculating slip control torque during driving in a 4WD mode, a handling control torque calculator 32 for calculating handling control torque during driving in a 4WD mode, a weighting factor determiner 40 for determining a weighting factor to be applied to torque blending of slip control torque and handling control torque, and a target torque calculator 50 for calculating target rear wheel torque by summing control torque weighting factors with the aforementioned calculated slip control torque and handling control torque and the weighting factor.

A method of controlling distribution of front and rear wheel torque according to some forms of the present disclosure may include operations of driving mode determination, torque requirement calculation, slip control torque and handling control torque calculation of the rear wheels, weighting factor determination, and target rear wheel torque calculation.

First, in the above control apparatus, vehicle driving information and state information collected from a vehicle may be inputted to the driving mode determiner 10 in real time and the driving mode determiner 10 in the control apparatus may determine a driving mode of the vehicle from the vehicle driving information and state information.

Here, determination of a driving mode refers to determination either a 2WD mode or a 4WD mode of a vehicle.

The vehicle driving information and the state information may include information required for the operations of driving mode determination, driver torque requirement calculation, and slip control torque and handling control torque calculation.

For example, the vehicle driving information and the state information may include vehicle speed detected by a vehicle speed detector, an accelerator value detected by an accelerator detector, a steering angle detected by a steering angle detector, wheel speed information of front and rear wheels detected by a wheel speed detector, and yaw rate information of a vehicle.

The accelerator value may indicate an accelerator manipulation state of a driver and may be electrical signal value (APS signal value) output by an accelerator position sensor (APS), i.e., an accelerator position.

The steering angle detector may be a steering angle sensor used in a general vehicle and may detect a driver steering input value, i.e., a steering angle according to steering wheel manipulation of a driver.

The wheel speed detector may be a wheel speed sensor installed in each wheel and, in some forms of the present disclosure, the wheel speed detector may use a speed difference between a front wheel and a rear wheel in order to determine whether slip control torque is applied. Wheel speed of a front wheel, wheel speed of a rear wheel, and vehicle data value may be used in order to calculate front wheel speed and rear wheel speed according to Equations 1 and 2 above.

The wheel speed of the front wheel may be an average speed of front left and right wheels while the wheel speed of the rear wheel may be an average speed of rear left and right wheels.

A method of calculating the front wheel speed and the rear wheel speed is not limited to a calculation method of Equations 1 and 2 above and, various methods are well known and would be obvious to one of ordinary skill in the art and, thus, in this specification, a detailed description of the calculation method will be omitted.

In addition, a yaw rate may be an actual yaw rate value (yaw rate detection value) detected by a yaw rate sensor or a yaw rate value (yaw rate estimation value) estimated from a steering angle, vehicle speed, and an understeer gradient according to Equation 3 above.

A method of determining a driving mode of a 2WD mode or a 4WD mode from vehicle driving information and state information by the driving mode determiner 10 would be obvious to one of ordinary skill in the art and, thus, a detailed description thereof will be omitted here.

For example, when a yaw rate error calculated based on a difference between a yaw rate estimation value (or yaw rate detection value) and a target yaw rate value for vehicle handling control, a difference between front wheel speed (e.g., average of left and right wheels) and rear wheel speed (e.g., average of left and right wheels), and an acceleration value (which is obtained from an APS signal) obtained according to accelerator manipulation are equal to or greater than preset reference values, respectively, a driving mode may be determined as a 4WD mode.

In some forms of the present disclosure, the target yaw rate may be calculated from information of a unique value of a vehicle (i.e., unique handling characteristic speed and wheelbase of the vehicle) as well as vehicle speed and a steering angle The target yaw rate is variable information that is well known in various vehicle control methods and a method of calculating the target yaw rate would be obvious to one of ordinary skill in the art and, thus, a detailed description thereof will be omitted here.

In some forms of the present disclosure, as described later, a yaw rate error value as vehicle state information may be used to determine whether handling control torque is applied (refer to operations S1' and S2' of FIG. 4) and may also be used to determine a weighting factor (refer to operations S4 and S4' of FIG. 4).

The torque requirement calculator 20 may calculate all torque values required for vehicle driving (i.e., driver torque requirement based on vehicle speed, accelerator value) and a method of calculating the torque requirement would also be obvious to one of ordinary skill in the art and, thus, a detailed description thereof will be omitted here.

After the driving mode determiner 10 determines a 4WD mode and the torque requirement calculator 20 calculates torque requirement, the slip control torque calculator 31 and the handling control torque calculator 32 may calculate slip control torque and handling control torque, respectively.

In this case, when a speed difference between front and rear wheels or a difference between front wheel speed and rear wheel speed is greater than a preset first reference value, the slip control torque calculator 31 may calculate slip control torque (refer to operations S1, S2, and S3 of FIG. 4) and, when the speed difference is equal to or less than the first reference value, the slip control torque calculator 31 may determine slip control torque as 0.

When the yaw rate error is greater than a preset second reference value, the handling control torque calculator 32 may calculate handling control torque (refer to operations S1', S2', and S3' of FIG. 4) and, when the yaw rate is equal to or less than the second reference value, the handling control torque calculator 32 may determine handling control torque as 0.

As described above, in a 4WD vehicle, slip control torque and handling control torque may be calculated and may be used to control a vehicle in the 4WD mode and, in some forms of the present disclosure, a known method may be used to calculate the slip control torque and the handling control torque.

For example, the slip control torque may be calculated according to a predetermined equation using a speed difference between front and rear wheels, which is vehicle state information collected during driving in order to reduce the speed difference between front and rear wheels or a difference between front wheel speed and rear wheel speed.

However, conventionally, a slip control mode and a handling control mode are selected and are independently and separately performed according to priority using an on/off method. Calculated slip control torque is determined as target rear wheel torque of a 4WD mode or handling control torque is determined as target rear wheel torque of the 4WD mode.

Figure 4:
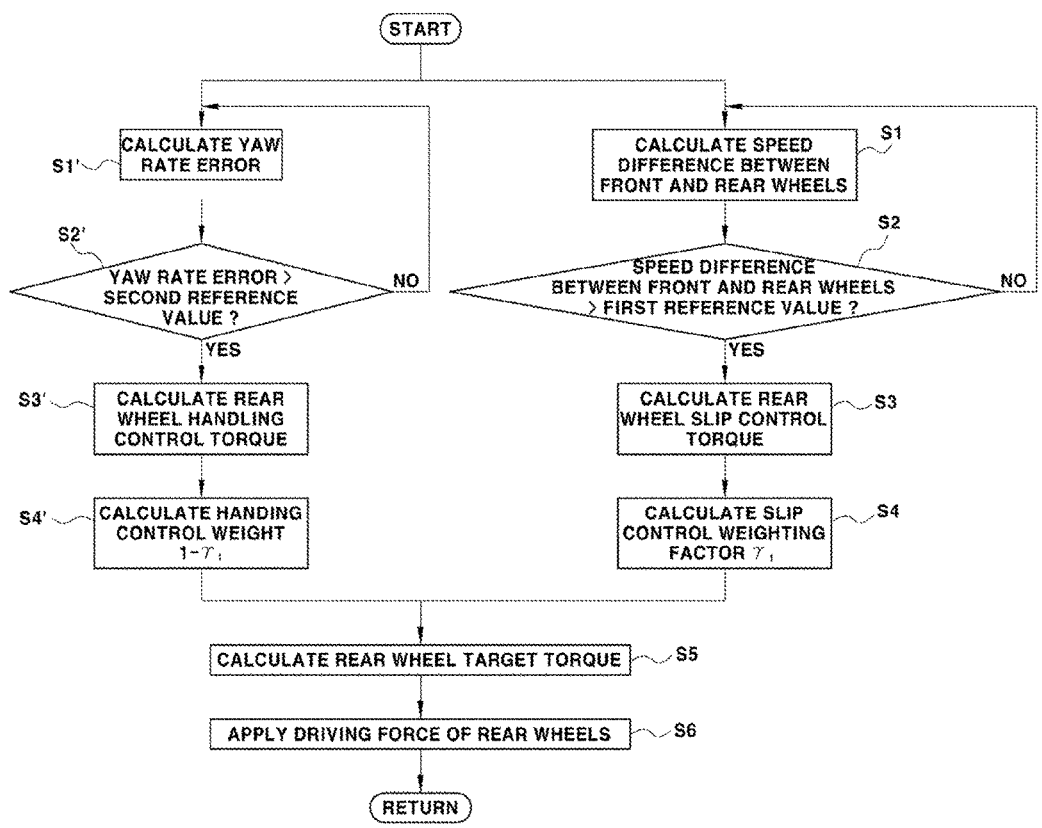
FIG. 4 is a flowchart setting a weighting factor.

On the other hand, in some forms of the present disclosure, after calculating a weighting factor (refer to operations S4 and S4' of FIG. 4), target rear wheel torque may be calculated using a method of summing values obtained by applying weighting factors to the calculated slip control torque and handling control torque (refer to operation S5 of FIG. 4). Then, driving force may be distributed to the front wheel and the rear wheel based on the driver torque requirement and the calculated target rear wheel torque.

In an e-4WD vehicle, torque output of a rear wheel driver (e.g., motor) may be controlled so as to apply target rear wheel torque to the rear wheel (refer to operation S6 of FIG. 4) and driving of a front wheel driver (e.g., engine) may be controlled so as to output target front wheel torque of a value obtained by subtracting target rear wheel torque from driver torque requirement.

In addition, in a 4WD vehicle including a power distribution device such as a transfer case, an operation of the power distribution device may be controlled so as to distribute driving force (torque), that is, to distribute and apply respective target torques to the front wheel and the rear wheel according to respective target torques of front and rear wheels.

Such driving force distribution control (i.e., front and rear wheel torque distribution control) may be performed by a separate component of the control apparatus in some forms of the present disclosure. It may also refer to components for calculating target front wheel torque, components for controlling output of a front wheel driver or a rear wheel driver according to the calculated target front wheel torque and target rear wheel torque, or components for controlling an operation of the power distribution device.

The target torque calculator 50 may calculate target rear wheel torque $T_{total}$ using slip control torque $T_{slip}$ and handling control torque $T_{handling}$ calculated in a 4WD mode and a weighting factor determined by the weighting factor determiner 40.

Summing weighting factors is obtained by applying weighting factors to slip control torque and handling control torque may be based on the following equation.

$$T_{total} = \gamma_1 \times T_{slip} + \gamma_2 \times T_{handling} \qquad \text{[Equation 4]}$$
$$= \gamma_1 \times T_{slip} + (1 - \gamma_1) \times T_{handling}$$

Here, $\gamma_1$ is a slip control weighting factor and $\gamma_2$ is a handling control weighting factor.

In Equation 4 above, $\gamma_2 = 1 - \gamma_1$ and, thus, the handling control weighting factor may be according to $1 - \gamma_1$ and, here, $\gamma_1$ may be set as a positive value equal to or less than 1 in the set data.

Accordingly, when $\gamma_1$ is obtained, torque blended from slip control torque and handling control torque, i.e., target rear wheel torque calculated using a weighting factor summing method, may be calculated.

The weighting factor determiner 40 may store set data for determining the weighting factor $\gamma_1$ and the set data may be data obtained by setting a weighting factor value according to a value of the yaw rate error $\psi_e$ that is vehicle state information.

FIG. 4 is a flowchart setting of a weighting factor in some forms of the present disclosure. As illustrated in the drawing, the set data may be data obtained by setting the weighting factor value $\gamma_1$ corresponding to the value of the yaw rate error $\psi_e$.

The weighting factor value according to the yaw rate error value may be obtained based on data acquired during research and testing, or evaluation procedures during vehicle development. It may also be a value that is interpretively and experimentally obtained in consideration of core parameters for determining dynamic characteristics based on a vehicle driving condition and other relevant information in an overall system.

Accordingly, when slip control torque and handling control torque are calculated and, then, a weighting factor value corresponding to a current yaw rate error value is obtained in a 4WD mode, the target rear wheel torque may be obtained by summing values after applying weighting factor values to respective control torques.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for controlling distribution of torque of front and rear wheels of a four-wheel drive (4WD) vehicle, the apparatus comprising:
  a slip control torque calculator configured to calculate slip control torque of the rear wheels based on information collected from the vehicle during driving in a 4WD mode;
  a handling control torque calculator configured to calculate handling control torque of the rear wheels based on the information collected from the vehicle during driving in the 4WD mode;
  a weighting factor determiner configured to determine a slip control weighting factor and a handling control weighting factor based on vehicle state information;
  a target torque calculator configured to calculate target torque of the rear wheels by summing the weighting factors applied to the slip control torque and the handling control torque, respectively, wherein the target torque of the rear wheels is a target value of the torque distributed to the rear wheels; and a controller configured to distribute driving force to the front wheels and the rear wheels based on a driver torque requirement and the calculated target rear wheel torque.

2. The apparatus of claim 1, further comprising:
a torque requirement calculator configured to calculate torque requirement of a driver from vehicle driving information and the vehicle state information, wherein target torque of the front wheels is determined by subtracting the target torque of the rear wheels from the torque requirement of the driver, wherein the target torque of the front wheels is a target value of the torque distributed to the front wheels.

3. The apparatus of claim 1, wherein the slip control torque calculator is configured to:
when a speed difference between the front wheels and the rear wheels is greater than a predetermined reference value, calculate the slip control torque; and
when the speed difference between the front wheels and the rear wheels is equal to or less than the predetermined reference value, determine the slip control torque as zero.

4. The apparatus of claim 1, wherein the slip control torque calculator is configured to:
when a difference between speed of the front wheels and speed of the rear wheels is greater than a predetermined reference value, calculate the slip control torque; and
when the difference between the speed of the front wheels and the speed of the rear wheels is equal to or less than the predetermined reference value, determine the slip control torque as zero.

5. The apparatus of claim 1, wherein the handling control torque calculator is configured to:
when a yaw rate error value is greater than a predetermined reference value, calculate the handling control torque; and
when the yaw rate error value is equal to or less than the predetermined reference value, determine the handling control torque as zero, wherein the yaw rate error value is calculated based on a difference between a yaw rate value of the vehicle detected by a yaw rate sensor and a target yaw rate value for vehicle handling control.

6. The apparatus of claim 1, wherein the handling control torque calculator is configured to:
when a yaw rate error value is greater than a predetermined reference value, calculate the handling control torque; and
when the yaw rate error value is equal to or less than the predetermined reference value, determine the handling control torque as zero, wherein the yaw rate error value is calculated based on a difference between a yaw rate estimation value using vehicle speed and steering angle information of the vehicle and the target yaw rate value for vehicle handling control.

7. The apparatus of claim 1, wherein the weighting factor determiner is configured to:
determine the slip control weighting factor or the handling control weighting factor from the yaw rate error value as the vehicle state information, wherein a yaw rate error value is calculated based on a difference between a yaw rate value of the vehicle detected by a yaw rate sensor and a target yaw rate value for vehicle handling control; and
when the slip control weighting factor or the handling control weighting factor is determined, use data obtained by setting the slip control weighting factor or the handling control weighting factor depending on the yaw rate error value.

8. The apparatus of claim 1, wherein the weighting factor determiner is configured to:
determine the slip control weighting factor or the handling control weighting factor from a yaw rate error value as the vehicle state information; and
when the slip control weighting factor or the handling control weighting factor is determined, use data obtained by setting the slip control weighting factor or the handling control weighting factor depending on the yaw rate error value, wherein the yaw rate error value is calculated based on the difference between a yaw rate estimation value using a vehicle speed and a steering angle information of the vehicle and a target yaw rate value for vehicle handling control.

9. The apparatus of claim 7, wherein the handling control weighting factor is determined as a value obtained by subtracting the slip control weighting factor from 1, wherein the slip control weighting factor is set as a positive value equal to or less than 1.

10. The apparatus of claim 8, wherein the handling control weighting factor is determined as a value obtained by subtracting the slip control weighting factor from 1, wherein the slip control weighting factor is set as a positive value equal to or less than 1.

11. A method of controlling distribution of torque of front and rear wheels of a four wheel drive (4WD) vehicle, the method comprising:
calculating, with a controller, slip control torque of the rear wheels based on information collected from the vehicle during driving in a 4WD mode;
calculating, with the controller, handling control torque for the rear wheels based on the information collected from the vehicle during driving in the 4WD mode;
determining, with the controller, a slip control weighting factor and a handling control weighting factor based on vehicle state information;
calculating, with the controller, target torque of the rear wheels by summing the weighting factors applied to the slip control torque and the handling control torque, respectively, wherein the target torque of the rear wheels is a target value of torque distributed to the rear wheels; and
distributing, with the controller, driving force to the front wheels and the rear wheels based on a driver torque requirement and the calculated target rear wheel torque.

12. The method of claim 11, further comprising:
calculating, with the controller, torque requirement of a driver from vehicle driving information and the vehicle state information, wherein the controller is configured to determine target torque of the front wheels by subtracting the target torque of the rear wheels from the torque requirement of the driver, wherein the target torque of the front wheels is a target value of the torque distributed to the front wheels.

13. The method of claim 11, wherein calculating the slip control torque comprises:
when a speed difference between the front wheels and the rear wheels is greater than a predetermined reference value, calculating the slip control torque; and when the speed difference between the front wheels and the rear wheels is equal to or less than the predetermined reference value, determining the slip control torque as zero.

14. The method of claim 11, wherein calculating the slip control torque comprises:
- when a difference between speed of the front wheels and speed of the rear wheels is greater than a predetermined reference value, calculating the slip control torque; and
- when the difference between the speed of the front wheels and the speed of the rear wheels is equal to or less than the predetermined reference value, determining the slip control torque as zero.

15. The method of claim 11, wherein calculating the handling control torque comprises:
- when a yaw rate error value is greater than a predetermined reference value, calculating the handling control torque; and
- when the yaw rate error value is equal to or less than the predetermined reference value, determining the handling control torque as zero,
- wherein the yaw rate error value is calculated based on a difference between a yaw rate value of the vehicle detected by a yaw rate sensor and a target yaw rate value for vehicle handling control.

16. The method of claim 11, wherein calculating the handling control torque comprises:
- when a yaw rate error value is greater than a predetermined reference value, calculating the handling control torque; and
- when the yaw rate error value is equal to or less than the predetermined reference value, determining the handling control torque as zero,
- wherein the yaw rate error value is calculated based on a difference between a yaw rate estimation value using vehicle speed and steering angle information of the vehicle and the target yaw rate value for vehicle handling control.

17. The method of claim 11, wherein determining the weighting factor comprises:
- determining the slip control weighting factor or the handling control weighting factor from a yaw rate error value as the vehicle state information, wherein the yaw rate error value is calculated based on a difference between a yaw rate value of the vehicle detected by a yaw rate sensor and a target yaw rate value for vehicle handling control; and
- when the slip control weighting factor or the handling control weighting factor is determined, using data obtained by setting the slip control weighting factor or the handling control weighting factor depending on the yaw rate error value.

18. The method of claim 11, wherein determining the weighting factor comprises:
- determining the slip control weighting factor or the handling control weighting factor from a yaw rate error value as the vehicle state information; and
- when the slip control weighting factor or the handling control weighting factor is determined, using data obtained by setting the slip control weighting factor or the handling control weighting factor depending on the yaw rate error value,
- where in the yaw rate error value is calculated based on the difference between a yaw rate estimation value using a vehicle speed and a steering angle information of the vehicle and a target yaw rate value for vehicle handling control.

19. The method of claim 17 comprises:
determining the handling control weighting factor as a value obtained by subtracting the slip control weighting factor from 1, wherein the slip control weighting factor is set as a positive value equal to or less than 1.

20. The method of claim 18 comprises:
determining the handling control weighting factor as a value obtained by subtracting the slip control weighting factor from 1, wherein the slip control weighting factor is set as a positive value equal to or less than 1.

* * * * *